United States Patent
Aoki et al.

(10) Patent No.: US 10,323,142 B2
(45) Date of Patent: Jun. 18, 2019

(54) PERFLUOROELASTOMERIC COMPOSITIONS COMPRISING OXAZOLES

(71) Applicant: 3M INNOVATIVE PROPERTIES COMPANY, St. Paul, MN (US)

(72) Inventors: Tamon Aoki, Tokyo (JP); Tatsuo Fukushi, Woodbury, MN (US); Yuta Suzuki, Kanagawa (JP); Noriyuki Usami, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/573,848

(22) PCT Filed: May 5, 2016

(86) PCT No.: PCT/US2016/030866
§ 371 (c)(1),
(2) Date: Nov. 14, 2017

(87) PCT Pub. No.: WO2016/195900
PCT Pub. Date: Dec. 8, 2016

(65) Prior Publication Data
US 2018/0258271 A1    Sep. 13, 2018

Related U.S. Application Data

(60) Provisional application No. 62/168,318, filed on May 29, 2015.

(51) Int. Cl.
| | | |
|---|---|---|
| *C08K 3/04* | (2006.01) | |
| *C08K 3/22* | (2006.01) | |
| *C08K 3/26* | (2006.01) | |
| *C08K 3/34* | (2006.01) | |
| *C08K 3/36* | (2006.01) | |
| *C08K 5/14* | (2006.01) | |
| *C08K 5/353* | (2006.01) | |
| *C08L 27/12* | (2006.01) | |
| *C08L 27/14* | (2006.01) | |
| *C08L 27/18* | (2006.01) | |
| *C08L 27/20* | (2006.01) | |
| *C08K 5/3492* | (2006.01) | |

(52) U.S. Cl.
CPC .............. *C08L 27/20* (2013.01); *C08K 3/22* (2013.01); *C08K 3/26* (2013.01); *C08K 3/346* (2013.01); *C08K 3/36* (2013.01); *C08K 5/14* (2013.01); *C08K 5/353* (2013.01); *C08L 27/14* (2013.01); *C08L 27/18* (2013.01); *C08K 3/04* (2013.01); *C08K 5/34924* (2013.01); *C08K 2003/2237* (2013.01); *C08K 2003/265* (2013.01); *C08L 2205/025* (2013.01)

(58) Field of Classification Search
CPC combination set(s) only.
See application file for complete search history.

(56) References Cited

U.S. PATENT DOCUMENTS

| | | |
|---|---|---|
| 4,562,225 A | 12/1985 | Huber |
| 4,737,410 A | 4/1988 | Kantner |
| 5,225,504 A | 7/1993 | Tatsu |
| 5,284,900 A | 2/1994 | Izubayashi |
| 5,459,184 A | 10/1995 | Bunnelle |
| 5,618,896 A | 4/1997 | Ezzell |
| 5,677,389 A * | 10/1997 | Logothetis ............... C08F 8/00 525/326.3 |
| 5,789,489 A * | 8/1998 | Coughlin ............ C08F 214/262 525/326.3 |
| 5,936,060 A * | 8/1999 | Schmiegel .......... C08F 214/184 526/229 |
| 6,114,452 A | 9/2000 | Schmiegel |
| 6,121,355 A | 9/2000 | Tsunemine |
| 6,174,928 B1 * | 1/2001 | Mizuide .................. C08F 8/00 521/46 |
| 7,173,094 B2 * | 2/2007 | Morimoto ................ C08F 6/00 264/127 |
| 7,544,753 B2 * | 6/2009 | Nomura ................ C08F 214/18 524/460 |
| 7,847,031 B2 | 12/2010 | Omeis |
| 8,604,137 B2 | 12/2013 | Grootaert |
| 2004/0122182 A1 | 6/2004 | Kawasaki |
| 2004/0162395 A1 * | 8/2004 | Grootaert ................ C08K 5/18 525/326.2 |
| 2006/0235140 A1 | 10/2006 | Tanaka |
| 2006/0270780 A1 * | 11/2006 | Xu .......................... C08L 27/12 524/501 |
| 2006/0293432 A1 | 12/2006 | Hirano |
| 2008/0287627 A1 | 11/2008 | Noguchi |
| 2011/0284075 A1 * | 11/2011 | Hatakeyama ......... H01L 31/049 136/259 |
| 2012/0077935 A1 | 3/2012 | Gurevich |
| 2014/0235783 A1 | 8/2014 | Iida |

FOREIGN PATENT DOCUMENTS

| | | | |
|---|---|---|---|
| JP | 2002097380 A * | 4/2002 | |
| WO | WO-2010092022 A1 * | 8/2010 | ............ C08F 214/26 |
| WO | WO 2011-071984 | 6/2011 | |
| WO | WO 2014-003092 | 1/2014 | |
| WO | WO 2014-200973 | 12/2014 | |

OTHER PUBLICATIONS

International Search Report for PCT International Application No. PCT/US2016/030866, dated Aug. 12, 2016, 3 pages.

* cited by examiner

*Primary Examiner* — Nicole M. Buie-Hatcher
(74) *Attorney, Agent, or Firm* — Julie Lapos-Kuchar

(57) ABSTRACT

Described herein is a curable composition comprising: (a) a perfluoroelastomer gum having a carboxylic acid integrated absorbance ratio of at least 0.015; and (b) a compound comprising at least one oxazole moiety, and cured articles thereof.

20 Claims, No Drawings

US 10,323,142 B2

PERFLUOROELASTOMERIC COMPOSITIONS COMPRISING OXAZOLES

CROSS REFERENCE TO RELATED APPLICATIONS

This application is a national stage filing under 35 U.S.C. 371 of PCT/US2016/030866, filed May 5, 2016, which claims the benefit of U.S. Application No. 62/168,318, filed May 29, 2015, the disclosure of which is incorporated by reference in its/their entirety herein.

TECHNICAL FIELD

Perfluoroelastomeric compositions comprising (a) a perfluoropolymer having a carboxylic acid group and (b) a compound comprising at least one oxazole moiety are disclosed.

SUMMARY

There is a desire for perfluoroelastomeric compositions comprising a perfluoropolymer having acidic terminal groups being substantially free of metal and/or phosphorous atoms for use in applications, such as in the semiconductor industry.

In one aspect, a curable composition is described comprising:

(a) a perfluoroelastomer gum, comprising a perfluorinated polymer having an carboxylic acid integrated absorbance ratio of at least 0.015; and (b) a compound comprising at least one oxazole moiety.

In another aspect, a method of curing a perfluoroelastomer gum is described comprising:

(a) providing a mixture comprising (i) a perfluoroelastomer gum comprising a perfluorinated polymer having a carboxylic acid integrated absorbance ratio of at least 0.015; and (ii) a compound comprising at least one oxazole moiety; and (b) reacting the mixture with a curing agent.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"aryl" refers to a monovalent group that is aromatic. An aliphatic substituted aryl is a monovalent aromatic group that also comprises an aliphatic residue on the aryl moiety;

"backbone" refers to the main continuous chain of the polymer;

"crosslinking" refers to connecting two pre-formed polymer chains using chemical bonds or chemical groups;

"interpolymerized" refers to monomers that are polymerized together to form a polymer backbone;

"monomer" is a molecule which can undergo polymerization which then form part of the essential structure of a polymer;

"monomeric unit" is a divalent repeating unit derived from a monomer;

"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms;

"oligomer" refers to a structure comprising less than 20 interpolymerized divalent monomeric units The oligomer has a number average molecular weight (Mn) of at least 1,000 dalton and at most 10,000 daltons; and "polymer" refers to a macrostructure comprising interpolymerized divalent monomeric units. The polymer has a number average molecular weight (Mn) of at least 50,000 Dalton, at least 100,000 Dalton, at least 300,000 Dalton, at least 500,000 Dalton, at least, 750,000 Dalton, at least 1,000,000 Dalton, or even at least 1,500,000 Dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present application is directed toward amorphous perfluorinated polymers, which are used in perfluoroelastomer gums. The perfluoroelastomer gums are subsequently cured to form perfluorinated elastomers. The amorphous perfluorinated polymers (referred to herein as perfluorinated polymers) of the present disclosure comprise acidic terminal groups.

Perfluorinated elastomers are used in a wide variety of applications in which severe environments are encountered, specifically end uses where exposure to high temperatures and aggressive chemicals occur. In the semiconductor industry, perfluoroelastomers are used in processes that require resistance to $NF_3$ plasma. However, this industry has stringent requirements on material purity especially around metal ions and phosphorous.

The perfluoroelastomers' high temperature tolerance and chemical resistance is attributable to the stability and inertness of the copolymerized perfluorinated monomer units that form the major portion of the polymer backbone. The perfluorinated polymer, typically contains small quantities of less stable copolymerized cure site monomers, which promote effective crosslinking and curing chemistry of the perfluorinated polymer. The ends of the polymer chain, where the polymerization is initiated and terminated (referred to herein as terminal groups) can contain reactive groups as well, which are derived from the initiator, chain transfer agent, molecular weight regulator, and/or other compounds present during polymerization.

If the perfluoropolymer comprises terminal groups that are acidic in nature, the performance of the polymer during and/or after subsequent peroxide curing can be impacted. Therefore, stabilizing compounds traditionally have been added to the perfluoroelastomer gum to stabilize these acidic terminal groups and to improve, for example, the compression set of the resulting perfluoroelastomer. These stabilizing compound typically include for example metal hydroxide (such as calcium hydroxide and strontium hydroxide); metal oxide (such a magnesium oxide, lead oxide, calcium oxide, zinc oxide); metal carbonates (such as barium carbonate, hydrotalcite, and calcium carbonate); or phosphorous-containing salts (such as triphenyl benzyl phosphonium chloride). However, in some applications the metal and phosphorous atoms are undesirable because they can contaminate the processes the elastomer is used in.

In the present disclosure, the compound comprises at least one oxazole moiety. The compound may comprise 1, 2, 3, or more oxazole moieties.

Although not wanting to be limited by theory, it is believed that in the present disclosure, a compound comprising an oxazole moiety can stabilize the acidic terminal groups of a perfluorinated polymer, causing a traditional terminal group stabilizer to be unnecessary. In one embodiment, a compound comprising at least two oxazole moieties can assist in crosslinking the perfluoroelastomer gum.

In one embodiment, the compound comprising the oxazole moiety is a small molecule, having a molecular weight of less than 1000 g/mol, 500 g/mol, or even 200 g/mol. Alternatively, the compound comprising the oxazole moiety is an oligomer or a polymer.

As used herein, the phrase "oxazole moiety" refers to a heterocyclic structure, wherein the heterocyclic structure is a five-membered ring comprising a nitrogen and an oxygen atom separated by one carbon atom. As used herein, the oxazole moiety includes oxazolines, wherein the five-membered ring comprises one double bond. The unsaturated bond can be located in one of three positions represented by the following general formulas below, where A, R, and $R_1$-$R_4$ represent an atom or a chemical group.

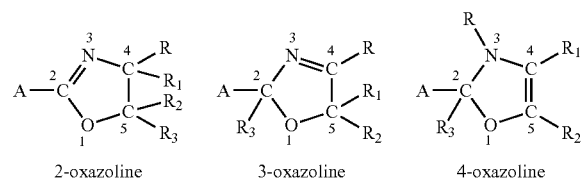

2-oxazoline    3-oxazoline    4-oxazoline

In one embodiment, the compound comprising an oxazole moiety comprises 2-oxazolines, which have one double bond between the second carbon and nitrogen.

In one embodiment, the compound comprising an oxazole moiety comprises a structure according to Formulas I or II:

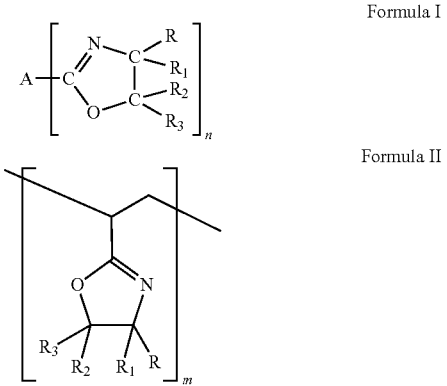

Formula I

Formula II

Wherein A is selected from the group consisting of
a hydrogen;
a cyclic or acyclic aliphatic or substituted cyclic or acyclic aliphatic moiety having from 1 to 20 carbon atoms;
an aryl or an aliphatic substituted aryl residue having from 6 to 20 carbon atoms, preferably 6 to 12 carbon atoms; and
a polymeric or oligomeric residue comprising from about 2 to 200,000 repeating units, preferably 2 to 100 or even 2 to 20 repeating units;
R, $R_1$, $R_2$ and $R_3$ independently represents H, $CH_3$, $CH_2CH_3$, or $C_6H_5$;
$R_1$ and $R_2$ independently represent H or $CH_3$, provided $R_1$ and $R_2$ are not both $CH_3$;
n represents an integer of 1, 2, 3 or 4; and m represents an integer of 2 to 200000, 2 to 100, or even 2 to 20.

In one embodiment, the compound comprising the oxazole moiety can be conveniently prepared by the reaction of the corresponding esters of a polycarboxylic acids and alkanolamines.

Exemplary compounds comprising an oxazole moiety of Formula I include: 4,5-dihydro-oxazole (2-oxazoline); 4,5-dihydro-2-methyl-oxazole (2-methyl-2-oxazoline); 2-ethyl-4,5-dihydro-oxazole (2-ethyl-2-oxazoline); 4,5-dihydro-2-(1-methylethenyl)-oxazole (2-isopropenyl-2-oxazoline);
4,5-dihydro-2-(1-methylethyl)-oxazole (2-isopropyl-2-oxazoline);
2-ethenyl-4,5-dihydro-oxazole (2-vinyl-2-oxazoline); 4,5-dihydro-2-phenyl-oxazole (2-phenyl-2-oxazoline); 4,5-dihydro-2-oxazolamine (2-amino-2-oxazoline); 4,4',5,5'-tetrahydro-2,2'-bioxazole (2,2'-bis(2-oxazoline));
2,2'-(1,3-phenylene)bis[4,5-dihydro-oxazole] (1,3-bis(4,5-dihydro-2-oxazolyl)benzene); 2,2'-(1,4-phenylene)bis[4,5-dihydro-oxazole] (1,4-bis(4,5-dihydro-2-oxaolyl)benzene); 2,6-bis[(4S)-4,5-dihydro-4-(1-methylethyl)-2-oxazolyl]-pyridine (2,2'-(2,6-pyridine-diyl)bis(4-isopropyl-2-oxazoline));
2,2'-(1-methylethylidene)bis[4,5-dihydro-4-phenyl-(4S, 4'S)-oxazole (2,2'-isopropylidene-bis(4-phenyl-2-oxazoline));
2,2'-(2,4-butanediyl) bis [4,5-dihydroxazole]:
2,2'-(1,2-ethanediyl)bis[4,5-dihydrooxazole];
2,2'-(1,4-phenylene)bis(4,5-dihydrooxazole];
2,2'-(1,5-naphthalenyl)bis[4,5-dihydrooxazole];
2,2'-(1,3-phenylene)bis[4,5-dihydrooxazole); and
2,2'-(1,8-anthracenyl)bis [4,5-dihydrooxazole].

Exemplary compounds comprising an oxazole moiety of Formula II include: oligomeric and polymeric materials having pendant oxazole moeities, such as poly[2-(alkenyl) 4,5-dihydrooxazole], e.g., poly[4,5-dihydro-2-(1-methylethenyl)-oxazole] or poly[2-isopropenyl-2-oxazoline]. Polymers or oligomers having pendant oxazole groups are also commercially available under the trade designation "EPOCROS" from Nippon Shokubai Co., LTD, Osaka, Japan.

The compound comprising the at least one oxazole moiety is mixed with a perfluoroelastomer gum. At least about 0.5, or even 1 parts by weight; and at most about 3, 5, or even 8 parts by weight of the compound comprising the at least one oxazole moiety is used per 100 parts by weight of perfluorinated polymer. Although the amount of the compound comprising the at least one oxazole moiety will generally depend on the nature of the compound being used.

The perfluorinated polymer is a macromolecule comprising interpolymerized repeating divalent monomeric units, wherein each of the monomeric units is perfluorinated (in other words, the monomeric unit comprises at least one C—F bond and no C—H bonds). The perfluorinated polymer may comprise terminal groups that are not perfluorinated based on the initiator and/or chain transfer agent, used as is known in the art.

The perfluorinated polymer is obtained generally by polymerizing one or more types of perfluorinated monomers such as perfluorinated olefins and perfluorinated olefins comprising ether linkages. Exemplary perfluorinated monomers include: tetrafluoroethylene, hexafluoropropylene, pentafluoropropylene, triflourochloroethylene, perfluoro vinyl ether, and perfluoro allyl ether.

Examples of perfluorovinyl ethers that can be used in the present disclosure include those that correspond to the formula: $CF_2=CF-O-R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2=CFO(R^a_fO)_n(R^b_fO)_mR^c_f$ wherein $R^a_f$ and $R^b_f$ are different linear or branched perfluoroalkylene groups of 1-6 carbon atoms, in particular 2-6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, and $CF_3-(CF_2)_2-O-CF(CF_3)-CF_2-O-CF(CF_3)-CF_2-O-CF=CF_2$.

Examples of perfluoroallyl ethers that can be used in the present disclosure include those that correspond to the formula: $CF_2=CF(CF_2)-O-R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2=CF_2-CF_2-O-(CF_2)_nF$ wherein n is an integer from 1 to 5, and $CF_2=CF_2-CF_2-O-(CF_2)_x-O-(CF_2)_y-F$ wherein x is an integer from 2 to 5 and y is an integer from 1 to 5. Specific examples of perfluorinated allyl ethers include perfluoro (methyl allyl) ether ($CF_2=CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3-(CF_2)_2-O-CF(CF_3)-CF_2-O-CF(CF_3)-CF_2-O-CF_2CF=CF_2$, and combinations thereof.

In the present disclosure, the perfluorinated polymer may be polymerized in the presence of a chain transfer agent and/or cure site monomers to introduce cure sites such as I, Br, and/or CN, into the fluoropolymer.

Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

In one embodiment, the cure site monomers may be derived from one or more compounds of the formula: a) $CX_2=CX(Z)$, wherein: (i) X each is independently H or F; and (ii) Z is I, Br, $R_f-U$ wherein U=I or Br and $R_f$=a perfluorinated alkylene group optionally containing O atoms or (b) $Y(CF_2)_qY$, wherein: (i) Y is Br or I or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of $CF_2=CFCF_2I$, $ICF_2CF_2CF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CF_2=CFCF_2Br$, $CF_2=CFOCF_2CF_2Br$, $CF_2=CFCl$, $CF_2=CFCF_2Cl$, and combinations thereof.

In another embodiment, the cure site monomers comprise nitrogen-containing cure moieties. Useful nitrogen-containing cure site monomers include nitrile-containing fluorinated olefins and nitrile-containing fluorinated vinyl ethers, such as: perfluoro(8-cyano-5-methyl-3,6-dioxa-1-octene); $CF_2=CFO(CF_2)_LCN$ wherein L is an integer from 2 to 12; $CF_2=CFO(CF_2)_uOCF(CF_3)CN$ wherein u is an integer from 2 to 6; $CF_2=CFO[CF_2CF(CF_3)O]_q(CF_2O)_yCF(CF_3)CN$ or $CF_2=CFO[CF_2CF(CF_3)O]_q(CF_2)_yOCF(CF_3)CN$ wherein q is an integer from 0 to 4 and y is an integer from 0 to 6; or $CF_2=CF[OCF_2CF(CF_3)]_rO(CF_2)_tCN$ wherein r is 1 or 2, and t is an integer from 1 to 4; and derivatives and combinations of the foregoing. Examples of a nitrile-containing cure site monomer include $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

The perfluorinated polymers of the present disclosure comprise acidic terminal groups. These acidic terminal groups can be determined by an integrated absorbance ratio method based on Fourier transform infrared analysis (FTIR) and relies on the baseline corrected integrated absorption underneath prominent peaks in the FTIR spectrum of a pressed film of the perfluorinated elastomer gum. The method is disclosed below and discussed in further detail in U.S. Pat. No. 6,114,452 (Schmiegel) and U.S. Pat. No. 8,604,137 (Grootaert et al.), herein incorporated by reference.

In the present disclosure, four different regions of the FTIR spectrum are examined.

First, the integrated absorbance of the most prominent peaks between approximately 1620 cm$^{-1}$ to 1840 cm$^{-1}$ are measured. These peaks correspond to absorbances attributable to carbonyl moieties, including carboxyl, carboxylate, and carboxamide groups present in the polymer.

Second, the integrated absorbance of the most prominent peaks between approximately 1755 cm$^{-1}$ to 1797 cm$^{-1}$ are measured. These peaks correspond to absorbances attributable to carboxylic acid groups present in the polymer.

Third, the C—F stretch overtone between 2220 cm$^{-1}$, and 2740 cm$^{-1}$ is determined, which is indicative of the thickness of the sample. This value is used to baseline correct (or normalize) the integrated absorbance of the carbonyl and carboxylic acid peak values.

If the perfluorinated polymer comprises nitrile groups (such as nitrile cure sites), the integrated absorbance of the most prominent peaks between approximately 2232 cm$^{-1}$ to 2277 cm$^{-1}$ are measured. This value is then subtracted from the C—F stretch overtone value since the C—N stretch overlaps the C—F stretch overtone to create a "corrected C—F stretch overtone".

An integrated absorbance value is then determined by dividing the carbonyl integrated absorbance by the C—F stretch overtone (or the corrected C—F stretch overtone if nitriles are present) to generate a carbonyl integrated absorbance ratio. In one embodiment, the perfluoroelastomer gum of the present disclosure, has a carbonyl integrated absorbance ratio of at least 0.060, or even 0.065. In another embodiment, a carboxylic acid integrated absorbance ratio is determined by dividing the carboxylic acid integrated absorbance by the C—F stretch overtone (or the corrected C—F stretch overtone if nitriles are present) to generate a carboxylic acid integrated absorbance ratio. In one embodiment, the perfluoroelastomer gum of the present disclosure, has a carboxylic acid integrated absorbance ratio of at least 0.012, or even 0.015.

In addition to the perfluorinated polymer and the compound comprising at least one oxazole moiety, the curable elastomeric composition can further comprise a curing agent and optional additional additives.

Crosslinking of the perfluorinated elastomer gum can be performed with a peroxide cure system (or curative).

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid such as diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide. Examples of the organic peroxide include benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide, and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of perfluorinated polymer. Other conventional radical initiators are suitable for use with the present disclosure.

This crosslinking agent and crosslinking aid each may be used in a conventionally known amount, and the amount used can be appropriately determined by one skilled in the art. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the perfluorinated polymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the perfluorinated polymer.

For the purpose of, for example, enhancing the strength or imparting the functionality, conventional adjuvants, such as, for example, fillers, process aids, or colorants may be added to the composition.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10).

In one embodiment, the composition comprises less than 40, 30, 20, 15, or even 10% by weight of the inorganic filler.

The perfluorinated elastomer gum comprising the perfluorinated polymer is mixed with the compound comprising the at least one oxazole moiety and optional conventional adjuvants. The method for mixing include, for example, kneading with use of a twin roll for rubber, a pressure kneader or a Banbury mixer.

The mixture may then be processed and shaped such as by extrusion or molding to form an article of various shapes such as sheet, a hose, a hose lining, an o-ring, a gasket, or a seal composed of the composition of the present disclosure. The shaped article may then be heated to cure the gum composition and form a cured elastomer article.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

Compression set is the deformation of the perfluoroelastomer remaining once a force is removed. Generally, lower compression set values are better (i.e., less deformation of the material). In one embodiment of the present disclosure, the cured perfluoroelastomer made without a traditional stabilizing compound, and including a compound comprising at least one oxazole moiety has improved compression set over the same cured perfluoroelastomer made without the compound comprising at least one oxazole moiety.

Although, not wanting to be limited by theory, it is believed that the compounds comprising at least one oxazole moiety of the present disclosure react with an acidic terminal group (such as a carboxylic acid group) to ring open, forming an ester amide group as shown in the equation below, wherein P is a polymer:

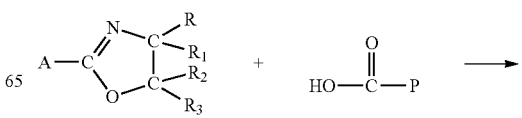

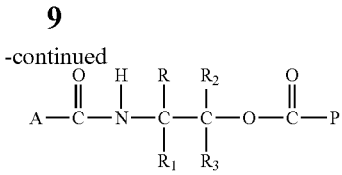

In one embodiment of the present disclosure, the composition comprising the perfluoroelastomer gum or the cured perfluoroelastomer is substantially free of a metal and/or phosphonium atom. As used herein, essentially free of a metal or essentially free of a phosphonium atom means less than about 0.02, 0.01, 0.005, or even 0.001 parts by weight per 100 parts by weight of the perfluorinated elastomer or even none present.

In one embodiment of the present disclosure, the composition comprising the perfluoroelastomer gum or the cured perfluoroelastomer is substantially free of a traditional stabilizing compound. As used herein, essentially free means less than about 0.02, 0.01, 0.005, or even 0.001 parts by weight per 100 parts by weight of the perfluorinated elastomer or even none present.

Compositions of the present disclosure may be used in articles, such as a hose, a gasket, or a seal. These compositions may or may not be cured.

Exemplary embodiments of the present disclosure include the following:

Embodiment 1

A curable composition comprising:
(a) a perfluoroelastomer gum, comprising a perfluorinated polymer having an carboxylic acid integrated absorbance ratio of at least 0.015; and
(b) a compound comprising at least one oxazole moiety.

Embodiment 2

The composition of embodiment 1, wherein the compound comprises at least two oxazole moieties.

Embodiment 3

The composition of embodiment 2, wherein the compound is selected from the group consisting of: 1,3,-bis(4, 5-dihydro-2-oxazolyl) benzene; and 1,4-bis(4,5-dihydro-2-oxazolyl) benzene.

Embodiment 4

The composition of embodiment 1, wherein the compound comprising the oxazole is selected from the group consisting of: 4,5-dihydro-2-phenyl-oxazole; and 1,3,5-tris (4, 5-dihydro-2-oxazolyl) benzene.

Embodiment 5

The composition of any one of the previous embodiments, wherein the perfluorinated polymer comprises interpolymerized units derived from monomers selected from tetrafluoroethylene, hexafluoropropylene, perfluoroalkylvinyl ethers, and perfluoroalkyl allyl ethers.

Embodiment 6

The composition of any one of the previous embodiments, wherein the perfluorinated polymer comprises a cure site selected from at least one of bromine, iodine, and nitrile.

Embodiment 7

The composition of any one of the previous embodiments, wherein the composition is substantially free of a metal and phosphorous.

Embodiment 8

The composition of any one of the previous embodiments, further comprising a peroxide curing agent.

Embodiment 9

The composition of embodiment 8, wherein the peroxide curing agent is selected from at least one of: benzoyl peroxide, dichlorobenzoyl peroxide, dicumyl peroxide, 2,5-dimethyl-2,5-di(t-butylperoxy)hexane, di-t-butyl peroxide, t-butylperoxy benzoate, and 2,5-dimethyl-2,5-di(t-butylperoxy)hexane-3, and lauroyl peroxide.

Embodiment 10

The composition of any one of embodiments 8-9, further comprising a co-agent selected from at least one of 1,3,5-triallyl isocyanurate(TAIC), 1,3,5-trimethallyl isocyanurate (TMAIC).

Embodiment 11

The composition of any one of the previous embodiments, further comprising an inorganic filler selected from at least one of carbon black, graphite, clay, silica, talc, diatomaceous earth, titanium oxide, and calcium carbonate.

Embodiment 12

A cured article comprising the composition of any one of the previous embodiments.

Embodiment 13

The cured article according to embodiment 12, wherein the cured article is a hose, a gasket, or a seal.

Embodiment 14

A method of curing a perfluoroelastomer gum comprising:
(a) providing a mixture comprising (i) a perfluoroelastomer gum comprising a perfluorinated polymer having a carboxylic acid integrated absorbance ratio of at least 0.015; and (ii) a compound comprising at least one oxazole moiety; and
(b) reacting the mixture with a curing agent.

Embodiment 15

The method of embodiment 14, wherein the fluoroelstomer gum is substantially free of a metal and phosphorous.

Embodiment 16

The method of any one of embodiments 14-15, wherein the compound comprise at least two oxazole moieties.

Embodiment 17

The method of any one of embodiments 14-16, wherein the compound is selected from the group consisting of: 1,3-bis(4,5-dihydro-2-oxazolyl) benzene; and 4,5-dihydro-2-phenyl-oxazole.

Embodiment 18

The method of any one of embodiments 14-17, wherein the perfluorinated polymer comprises interpolymerized units derived from monomers selected from at least one of tetrafluoroethylene, hexafluoropropylene, perfluoroalkylvinyl ethers, and perfluoroalkyl allyl ethers.

Embodiment 19

The method of any one of embodiments 14-18, wherein the curing agent is selected from a peroxide.

Embodiment 20

The method of any one of embodiments 14-19, wherein the compound comprises at least two oxazole moieties.

Embodiment 21

The method of any one of embodiments 14-20, wherein the perfluorinated polymer comprises a cure site selected from at least one of bromine, iodine, and nitrile.

Embodiment 22

The method of any one of embodiments 14-21, wherein the composition is substantially free of a metal and phosphorous.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; g=grams, min=minutes, hr=hour, ° C.=degrees Celsius, MPa=megapascals, and N-m=Newton-meter.

MATERIALS TABLE

| | |
|---|---|
| PFE 1 | Perfluoroelastomer prepared by emulsion polymerization having interpolymerized units of 65.9 mole percent tetrafluoroethylene (mol % TFE), 33.6 mol % perfluoromethyl vinyl ether (PMVE), and 0.5 mol % of a bromine-containing cure site monomer, CF2=CFBr. |
| PFE 2 | Perfluoroelastomer prepared by emulsion polymerization having interpolymerized units of 65.7 mole percent tetrafluoroethylene (mol % TFE), 33 mol % perfluoromethyl vinyl ether (PMVE), and 1.3 mol % of a nitrogen group-containing cure site monomer, CF2=CFO(CF2)5CN. |
| PFE 3 | Perfluoroelastomer prepared by emulsion polymerization having interpolymerized units of 65.7 mole percent tetrafluoroethylene (mol % TFE), 32.4 mol % perfluoromethyl vinyl ether (PMVE), and 1.9 mol % of a nitrogen group-containing cure site monomer, CF2=CFO(CF2)5CN. |
| PFE 4 | Prepared as described in Example 9 of WO 2014/200973 A1 (Grootaert, et al.) |
| PFE 5 | Latex of PFE 2 was blended (at 80 wt %) with 20 wt % of a fluoropolymer latex commercially available under the trade designation "Dyneon Fluorothermoplastic PFA 6900N" from 3M Co. St. Paul, MN. The latex blend was then coagulated, washed, and dried. |
| MT Carbon | Carbon black commercially available from Cancarb Ltd, Medicine Hat, Alta., Canada |
| Coagent | Triallyl-isocyanurate commercially available under the trade designation "TAIC" from Nippon Kasei Chemical Co. Ltd., Tokyo, Japan |
| Peroxide 1 | 2,5-dimethyl-2,5-di(t-butylperoxy)hexane, 100% commercially available from NOF Corp., Tokyo, Japan under the trade designation "PERHEXA 25B". |
| Peroxide 2 | 2,5-dimethyl-2,5-di(t-butylperoxy)-hexane, 50% active, available under the trade designation "VAROX DBPH-50" from Vanderbilt Chemicals, LLC., Norwalk, CT. |
| PBO | 1,3-bis(4,5-dihydro-2-oxazolyl)benzene available from Mikuni pharmaceutical industrial Co. Ltd., Osaka, Japan |
| PMO | 4,5-dihydro-2-phenyl-oxazole available from Sigma-Aldrich Corp., St. Louis, MO |

Integrated Absorbance

Perfluoroelastomer samples were analyzed using a Fourier transform infrared spectrometer to determine the integrated absorbance ratio. Shown in Table 1 below are the integrated absorbance ratios for various wavenumber ranges using 64 scans per analysis.

Two integrated absorbance ratios were calculated:

Carbonyl Int. Abs. was determined by measuring the integrated peak intensity between 1620-1840 $cm^{-1}$ and dividing it by the integrated peak intensity between 2220-2740 $cm^{-1}$. If a nitrile peak was detected (2232-2277 $cm^{-1}$), it was subtracted from the C—F overtone (2200-2740 $cm^{-1}$) to determine the ratio.

Carboxylic acid Int. Abs. was determined by measuring the integrated peak intensity between 1755-1797 $cm^{-1}$ and dividing it by the integrated peak intensity between 2220-2740 $cm^{-1}$. If a nitrile peak was detected (2232-2277 $cm^{-1}$), it was subtracted from the C—F overtone (2200-2740 $cm^{-1}$) to determine the ratio.

TABLE 1

| | Wave Number in $cm^{-1}$ | | | | Carbonyl | Carboxylic |
|---|---|---|---|---|---|---|
| Material | 1620-1840 | 1755-1797 | 2200-2740 | 2232-2277 | Int. Abs. | acid Int. Abs. |
| PFE 1 lot 1 | 20.3 | 5.3 | 296 | ND | 0.068 | 0.018 |
| PFE 1 lot 2 | 8.3 | 2.6 | 128 | ND | 0.065 | 0.020 |
| PFE 1 lot 3 | 7.4 | 1.9 | 121 | ND | 0.061 | 0.016 |
| PFE 2 | 24.0 | 4.8 | 254 | 3.8 | 0.096 | 0.019 |
| PFE 3 | 13.1 | 2.6 | 125 | 5.5 | 0.110 | 0.022 |
| PFE 4 | 12.2 | 2.3 | 213 | ND | 0.057 | 0.011 |
| PFE 5 | 26.7 | 4.8 | 278 | 4.4 | 0.098 | 0.018 |

ND = not detected

Cure Rheology

Cure rheology tests were carried out using uncured, compounded samples using a rheometer marketed under the trade designation PPA 2000 by Alpha technologies, Akron, Ohio, in accordance with ASTM D 5289-93a at 177° C., no pre-heat, 15 minute elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_S2$), the time for the torque to reach a value equal to $M_L+0.1(M_H-M_L)$, (t'10), the time for the torque to reach a value equal to $M_L+0.5(M_H-M_L)$, (t'50), and the time for the torque to reach $M_L+0.9(M_H-M_L)$, (t'90). Results are reported in Tables 2-5.

Molding and Compression Set

O-rings having a cross-section thickness of 0.139 inch (3.5 mm) and sheets having a thickness of 2.0 mm were molded and press cured, followed by a postcure as noted in the table. The dumbbell specimens were cutout from the sheets and subjected to physical property testing similar to the procedure disclosed in ASTM D412-06a (2013). The O-rings were subjected to compression set testing similar to the procedure disclosed in ASTM 395-89 method B, with 25% initial deflection. Results are reported in Tables 2-4.

Compounding 200 g batches were compounded with the amounts of materials as listed in Tables 2-5 on a two-roll mill.

TABLE 2

| (ALL used 20 phr MT Carbon, 0.75 phr Peroxide 1 and 1.75 phr coagent) | | | | | | | |
|---|---|---|---|---|---|---|---|
| Material (phr) | CE1A | CE1B | EX1A | EX1B | EX1C | EX1D | EX1E |
| PFE 1 | 100 | 100 | 100 | 100 | 100 | 100 | 100 |
| PBO | 0 | 0 | 0 | 0 | 0.5 | 1.0 | 2.0 |
| PMO | 0 | 0 | 1 | 2 | 0 | 0 | 0 |
| ZnO | 0 | 5 | 0 | 0 | 0 | 0 | 0 |
| Cure Rheology MDR (15 min @ 177° C.) | | | | | | | |
| $M_L$, in-lb (N-m) | 2.27 | 2.39 | 1.48 | 1.49 | 3.62 | 3.55 | 3.37 |
| $M_H$, in-lb (N-m) | 5.81 | 19.63 | 19.00 | 14.52 | 23.28 | 26.94 | 29.19 |
| $t_S2$, min | 1.40 | 0.63 | 1.23 | 2.92 | 0.82 | 1.00 | 1.22 |
| t'10, min | 0.58 | 0.59 | 1.12 | 2.26 | 0.78 | 1.00 | 1.28 |
| t'50, min | 1.04 | 0.95 | 2.47 | 5.69 | 1.47 | 2.16 | 3.00 |
| t'90, min | 3.48 | 2.9 | 6.31 | 11.70 | 2.72 | 3.96 | 5.58 |
| Physical Properties: Press Cure 15 min @ 177° C. and post cure 16 hrs @ 200° C.) | | | | | | | |
| Hardness, Shore A ASTM D2240 | 74 | 72 | 77 | 78 | 77 | 78 | 79 |
| 100% Modulus (MPa) | 10.7 | 10.5 | 13.3 | 12.4 | 9.7 | 10.3 | 10 |
| Tensile Strength (MPa) | 5.1 | 18.7 | 8.0 | 6.6 | 14.1 | 16.1 | 17.6 |
| Elongation @ break % | 240 | 160 | 194 | 250 | 140 | 140 | 150 |
| Compression set % (70 hrs @ 200° C.) | 98 | 38 | 39 | 43 | 32 | 27 | 29 |

TABLE 3

| (ALL used 20 phr MT Carbon, 0.75 phr Peroxide 1 and 1.75 phr coagent) | | | | | | | | |
|---|---|---|---|---|---|---|---|---|
| Material (phr) | CE2 | EX2A | EX2B | EX2C | CE3 | EX3A | EX3B | EX3C |
| PFE 2 | 100 | 100 | 100 | 100 | 0 | 0 | 0 | 0 |
| PFE 3 | 0 | 0 | 0 | 0 | 100 | 100 | 100 | 100 |
| PBO | 0 | 0.1 | 0.5 | 1.0 | 0 | 0.1 | 0.5 | 1.0 |
| Cure Rheology MDR (15 min @ 180° C.) | | | | | | | | |
| $M_L$, in-lb (N-m) | 1.7 | 3.2 | 3.0 | 2.7 | 1.2 | 2.0 | 2.1 | 2.0 |
| $M_H$, in-lb (N-m) | 18.7 | 18.6 | 22.8 | 26.3 | 17.2 | 19.0 | 23.1 | 26.5 |
| $t_S2$, min | 0.6 | 0.7 | 0.8 | 1.0 | 0.6 | 0.6 | 0.8 | 0.9 |
| t'10, min | 0.6 | 0.6 | 0.8 | 1.0 | 0.6 | 0.6 | 0.7 | 0.9 |
| t'50, min | 1.2 | 1.2 | 1.7 | 2.5 | 1.1 | 1.1 | 1.5 | 2.2 |
| t'90, min | 5.4 | 5.8 | 4.9 | 6.0 | 5.1 | 6.0 | 4.9 | 5.7 |
| Physical Properties: Press Cure 15 min @180° C. and post cure 16 hrs @ 200° C. | | | | | | | | |
| Hardness, Shore A ASTM D2240 | 80 | 79 | 80 | 81 | 79 | 78 | 80 | 81 |
| 100% Modulus (MPa) | 10.4 | 9.3 | 10.2 | 11.9 | 11.6 | 10.6 | 12.6 | 13.3 |
| Tensile Strength (MPa) | 20.3 | 17.0 | 18.3 | 17.6 | 17.4 | 14.6 | 15.0 | 16.4 |
| Elongation @ break % | 177 | 174 | 167 | 145 | 140 | 127 | 125 | 119 |
| Compression set % (70 hrs @ 200° C.) | 49 | 51 | 45 | 41 | 61 | 40 | 36 | 32 |

TABLE 4

(ALL used 20 phr MT Carbon, 2.5 phr
Peroxide 2 and 2.5 phr coagent)

| Material (phr) | CE3A | CE3B |
|---|---|---|
| PFE 4 | 100 | 100 |
| PBO | 0 | 1 |
| Cure Rheology MDR (12 min @ 177° C.) | | |
| $M_L$, in-lb (N-m) | 0.3 | 0.2 |
| $M_H$, in-lb (N-m) | 21.1 | 26.4 |
| $t_S2$, min | 0.3 | 0.4 |
| t'50, min | 0.4 | 0.7 |
| t'90, min | 0.8 | 2.3 |
| Physical Properties: Press Cure 10 min @177° C. and post cure 8 hrs @ 200° C. | | |
| Hardness, Shore A ASTM D2240 | 80 | 78 |
| 100% Modulus (MPa) | 2.0 | 3.2 |
| Tensile Strength (MPa) | 21.8 | 18.9 |
| Elongation @ break % | 107 | 91 |
| Compression set % (70 hrs @ 200° C.) | 32 | 37 |
| Compression set % (70 hrs @ 232° C.) | 72 | 65 |

TABLE 5

(nothing additional added)

| Material (phr) | CE4A | EX4 | CE4B |
|---|---|---|---|
| PFE 1 | 100 | 100 | 100 |
| PBO | 0 | 1 | 0 |
| ZnO | 0 | 0 | 1 |
| Cure Rheology MDR (12 min @ 177° C.) | | | |
| $M_L$, in-lb (N-m) | 1.8 | 2.7 | 1.8 |
| $M_H$, in-lb (N-m) | 2.0 | 4.1 | 1.9 |
| t'50, min | 1.6 | 1.3 | 1.3 |
| t'90, min | 9.6 | 2.2 | 3.5 |

As shown in Table 5 above, the PBO is contributing to the crosslinking of the fluoroelastomer as indicated by the increase in the torque.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A curable composition comprising:
   (a) a perfluoroelastomer gum, comprising a perfluorinated polymer having an carboxylic acid integrated absorbance ratio of at least 0.015; and
   (b) a compound comprising at least one oxazole moiety wherein the compound comprises at least two oxazole moieties.

2. The composition of claim 1, wherein the compound is selected from the group consisting of: 1,3,-bis(4,5-dihydro-2-oxazolyl) benzene; and 1,4-bis(4,5-dihydro-2-oxazolyl) benzene.

3. The composition of claim 1, wherein the composition is comprises less than 0.02 parts by weight of a metal and phosphorous per 100 parts by weight of the perfluorinated polymer.

4. The composition of claim 1, further comprising a peroxide curing agent.

5. The composition of claim 4, wherein the peroxide curing agent is selected from at least one of: benzoyl peroxide, dichlorobenzoyl peroxide, dicumyl peroxide, 2,5-dimethyl-2,5-di(t-butylperoxy)hexane, di-t-butyl peroxide, t-butylperoxy benzoate, and 2,5-dimethyl-2,5-di(t-butylperoxy)hexane-3, and lauroyl peroxide.

6. The composition of claim 4, further comprising a co-agent selected from at least one of 1,3,5-triallyl isocyanurate (TAIC), 1,3,5-trimethallyl isocyanurate (TMAIC).

7. A cured article comprising the composition of claim 1.

8. The cured article according to claim 7, wherein the cured article is a hose, a gasket, or a seal.

9. The composition of claim 1, wherein the perfluorinated polymer comprises interpolymerized units derived from monomers selected from tetrafluoroethylene, hexafluoropropylene, perfluoroalkylvinyl ethers, and perfluoroalkyl allyl ethers.

10. The composition of claim 1, wherein the perfluorinated polymer comprises a cure site selected from at least one of bromine, iodine, and nitrile.

11. The composition of claim 1, further comprising an inorganic filler selected from at least one of carbon black, graphite, clay, silica, talc, diatomaceous earth, titanium oxide, and calcium carbonate.

12. A method of curing a perfluoroelastomer gum comprising:
   (a) providing a mixture comprising (i) a perfluoroelastomer gum comprising a perfluorinated polymer having a carboxylic acid integrated absorbance ratio of at least 0.015; and (ii) a compound comprising at least two oxazole moieties; and
   (b) reacting the mixture with a curing agent.

13. The method of claim 12, wherein the perfluoroelastomer gum comprises less than 0.02 parts by weight of a metal and phosphorous per 100 parts by weight of the perfluorinated polymer.

14. The method of claim 12, wherein the compound is selected from the group consisting of: 1,3,-bis(4,5-dihydro-2-oxazolyl) benzene; and 1,4-bis(4,5-dihydro-2-oxazolyl) benzene.

15. The method of claim 12, wherein the perfluorinated polymer comprises interpolymerized units derived from monomers selected from tetrafluoroethylene, hexafluoropropylene, perfluoroalkylvinyl ethers, and perfluoroalkyl allyl ethers.

16. The method of claim 12, wherein the curing agent is a peroxide.

17. The method of claim 16, wherein the peroxide curing agent is selected from at least one of: benzoyl peroxide, dichlorobenzoyl peroxide, dicumyl peroxide, 2,5-dimethyl-2,5-di(t-butylperoxy)hexane, di-t-butyl peroxide, t-butylperoxy benzoate, and 2,5-dimethyl-2,5-di(t-butylperoxy) hexane-3, and lauroyl peroxide.

18. The method of claim 16 further comprising a co-agent selected from at least one of 1,3,5-triallyl isocyanurate (TAIC), 1,3,5-trimethallyl isocyanurate (TMAIC).

19. The method of claim 12, further comprising an inorganic filler selected from at least one of carbon black, graphite, clay, silica, talc, diatomaceous earth, titanium oxide, and calcium carbonate.

20. The method of claim 12, wherein the perfluorinated polymer comprises a cure site selected from at least one of bromine, iodine, and nitrile.

* * * * *